United States Patent [19]

Ahlschwede et al.

[11] 4,037,487
[45] July 26, 1977

[54] SERVICE BRAKE LOCK MECHANISM

[75] Inventors: Brian Alvin Ahlschwede, Malcolm, Nebr.; Edwin Lee Whisler, Peosta, Iowa

[73] Assignee: Deere & Company, Moline, Ill.

[21] Appl. No.: 595,847

[22] Filed: July 14, 1975

[51] Int. Cl.² ............................................. G05G 5/06
[52] U.S. Cl. ....................................... 74/529; 74/512; 74/560
[58] Field of Search ................. 74/512, 529, 560, 478

[56] References Cited

U.S. PATENT DOCUMENTS

| | | | |
|---|---|---|---|
| 1,725,982 | 8/1929 | Hinds | 74/529 X |
| 1,978,977 | 10/1934 | Zerk | 74/512 |
| 2,995,047 | 8/1961 | Hinsey | 74/512 |
| 3,757,604 | 9/1973 | Schroeder | 74/529 |

FOREIGN PATENT DOCUMENTS

| | | | |
|---|---|---|---|
| 943,622 | 12/1963 | United Kingdom | 74/512 |

Primary Examiner—Samuel Scott
Assistant Examiner—Randall Heald

[57] ABSTRACT

A lock mechanism includes a locking pawl which is movable to a pedal-lock position for preventing a brake pedal from returning from a brake-engage to a normal brake-release position. The pawl is biased toward a pedal-lock position but is normally held in a pedal-release position through means of an actuator rod that is biased to a pawl-retain position. The rod has a foot-engageable portion so located that an operator can use one foot to simultaneously move the brake pedal to its brake-engage position and move the actuator to a pawl-release position permitting the pawl to move its pedal-lock position. The lock mechanism is constructed such that once the operator removes his foot from the locked brake pedal the actuator rod will move to an intermediate position spaced from the brake pedal and in which it is held by the engaged locking pawl so as to permit the operator to re-engage his foot with the brake pedal to overtravel the latter without again engaging the actuator rod, such overtravelling releasing the locking pawl and hence the actuator rod whereby the biasing force acting on the rod returns it and the pawl respectively to their pawl-retain and pedal release positions.

9 Claims, 7 Drawing Figures

SERVICE BRAKE LOCK MECHANISM

BACKGROUND OF THE INVENTION

The present invention relates to a releasable lock mechanism for the service brakes of a vehicle and more particularly relates to such a mechanism which represents an improvement over that disclosed in U.S. Pat. No. 3,757,604 issued on Sept. 11, 1973 to Kenneth Roger Schroeder and assigned to Deere & Company, as is the present application.

The above-identified patented lock mechanism includes a hand-operated actuator rod which is biased toward a pawl-deactivating position wherein it acts against a pawl which is biased toward a pedal-lock position, the bias acting on the rod being large enough to override that acting on the pawl. The rod may be movable to a detented pawl-releasing position wherein the counter biasing force is removed from the pawl prior to or after movement of a brake pedal to a brake-engage position. In the first case the biasing force acting on the locking pawl moves the latter against the brake pedal and when the brake pedal is subsequently moved to its brake-engage position the pawl moves to a pedal-lock position and in the second case, the locking pawl moves immediately to its pedal-lock position. The pawl is released from its pedal-lock position so as to release the brake pedal by releasing the actuator rod from its detented pawl-activating position, whereupon the biasing force acting thereon is again transferred to the pawl such that upon the brake pedal being overtraveled slightly beyond its brake-engage position the pawl will be released to return to its pedal-release position.

The patented lock mechanism has the disadvantage that the operator's hand as well as his foot is required to operate it. Thus, the operator must often interrupt operation of hand levers for controlling other functions of the vehicle in order to effect locking of the service brakes.

SUMMARY OF THE INVENTION

According to the present invention there is provided an improved lock mechanism for releasably locking a service brake in its engaged position.

An object of the invention is to provide a brake pedal lock mechanism which includes an actuator member which is selectively operated together with the brake pedal by a single motion of the operator.

Another object of the invention is to provide an actuator member, as set forth in the preceding paragraph which is located so as not to interfere with operation of the brake pedal regardless of whether the latter is in a brake-disengage position and released from the lock mechanism or in a brake-engage position and locked by the lock mechanism. Yet another object of the invention is to provide an actuator member which will automatically return to a pawl-retain position once the pawl is released from the brake pedal by overtravelling the latter.

A more specific object is to provide an actuator rod pivoted on the same axis as a locking pawl and having a lost motion connection with the pawl defined by respective abutment surfaces of the rod and pawl.

These and other objects will become apparent from a reading of the following description in conjunction with the appended drawings.

DESCRIPTION OF THE PREFERRED EMBODIMENT

Figure 1:
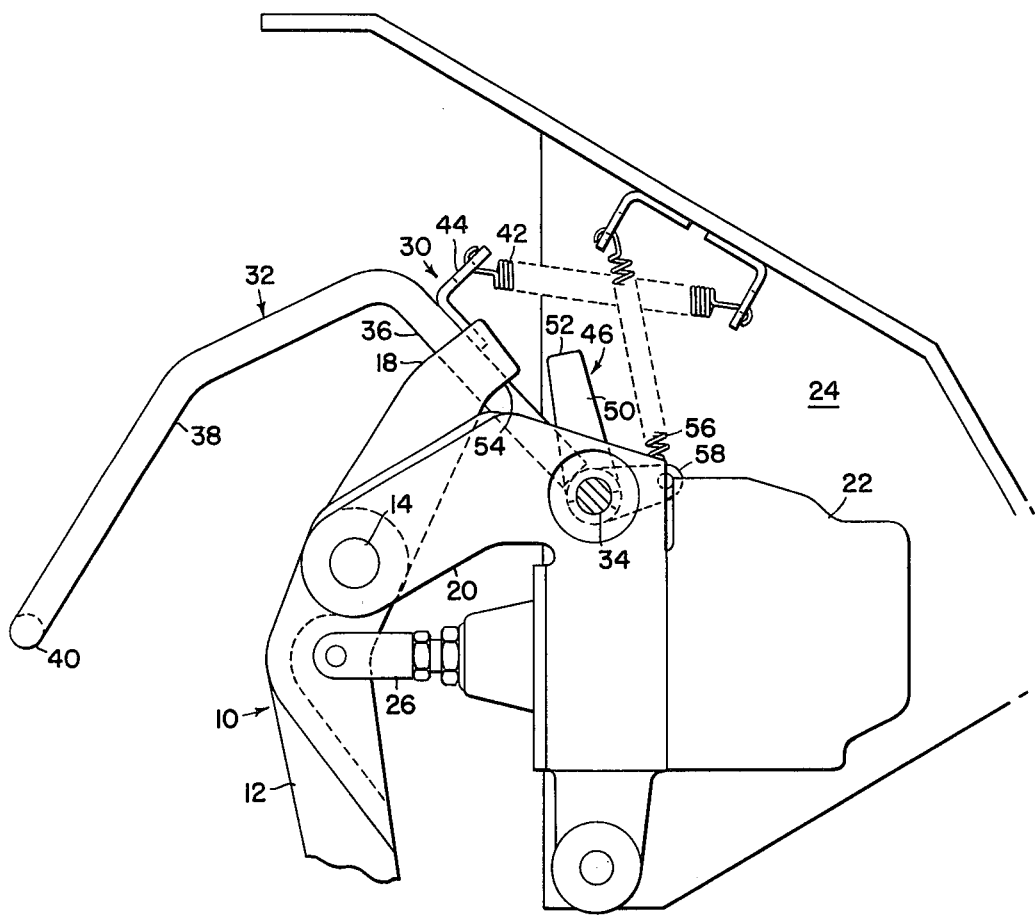
FIG. 1 is a side elevational view, partly in section, of the brake pedal and locking mechanism showing the brake pedal, actuator rod and locking pawl respectively in their normal brake-release, pawl-deactivating and pedal-release positions corresponding to a condition wherein the vehicle service brakes are released.
Figure 5:
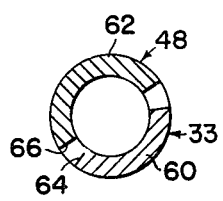
FIG. 5 is a sectional view taken along the line 5—5 of FIG. 4.
Figure 6:
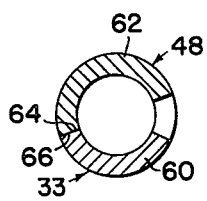
FIG. 6 is a view similar to FIG. 5 but showing the actuator rod in its intermediate position illustrated in dashed lines in FIG. 2.
Figure 2:
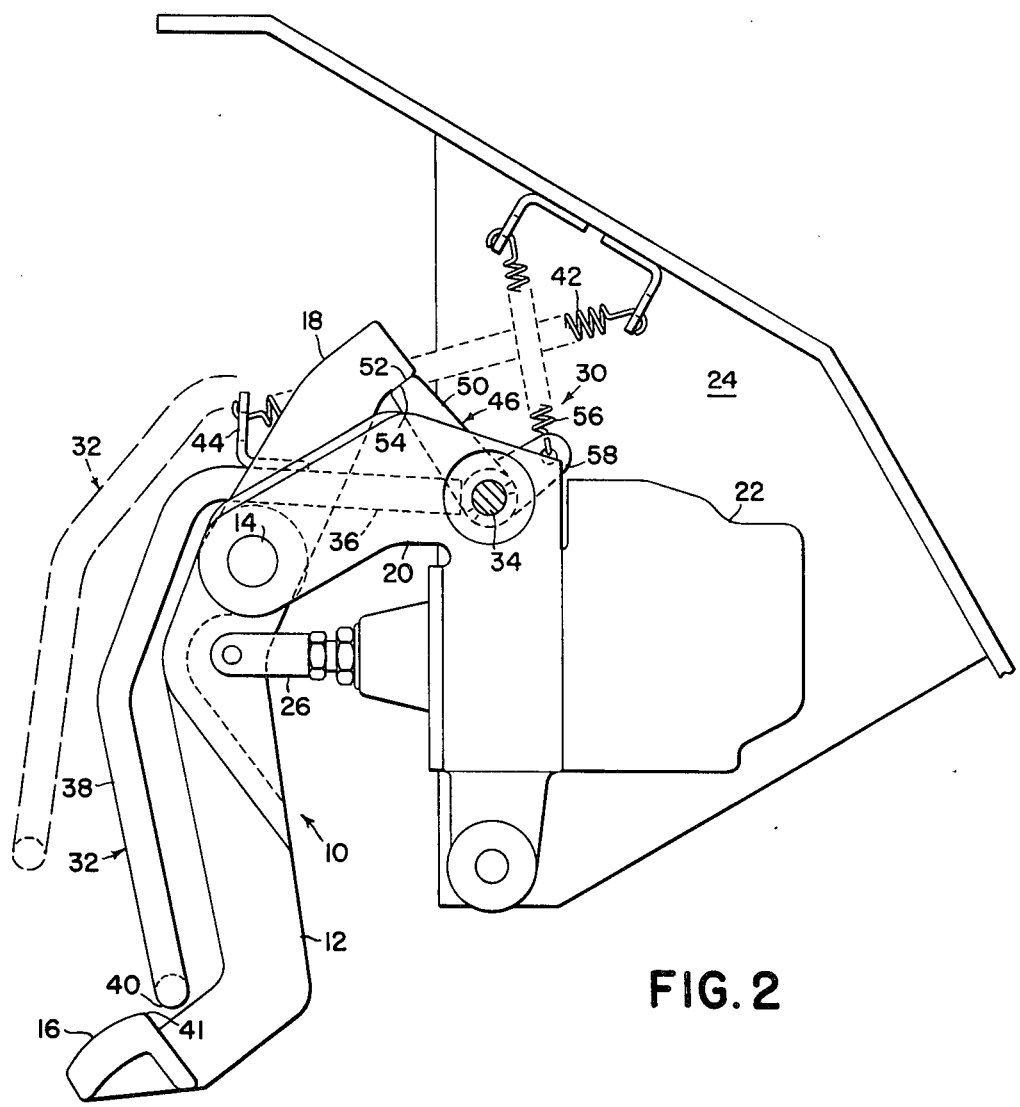
FIG. 2 is a view similar to FIG. 1 but showing the brake pedal, actuator rod and locking pawl in solid lines respectively in their brake-engage, pawl-activating and pedal-locking positions corresponding to a condition wherein the service brakes are locked in an engaged position and the operator's foot is engaged with the actuator rod; and showing the actuator rod in dashed lines in an intermediate released position wherein the service brakes are locked in their engaged position and the operator's foot is removed from the actuator rod.
Figure 3:
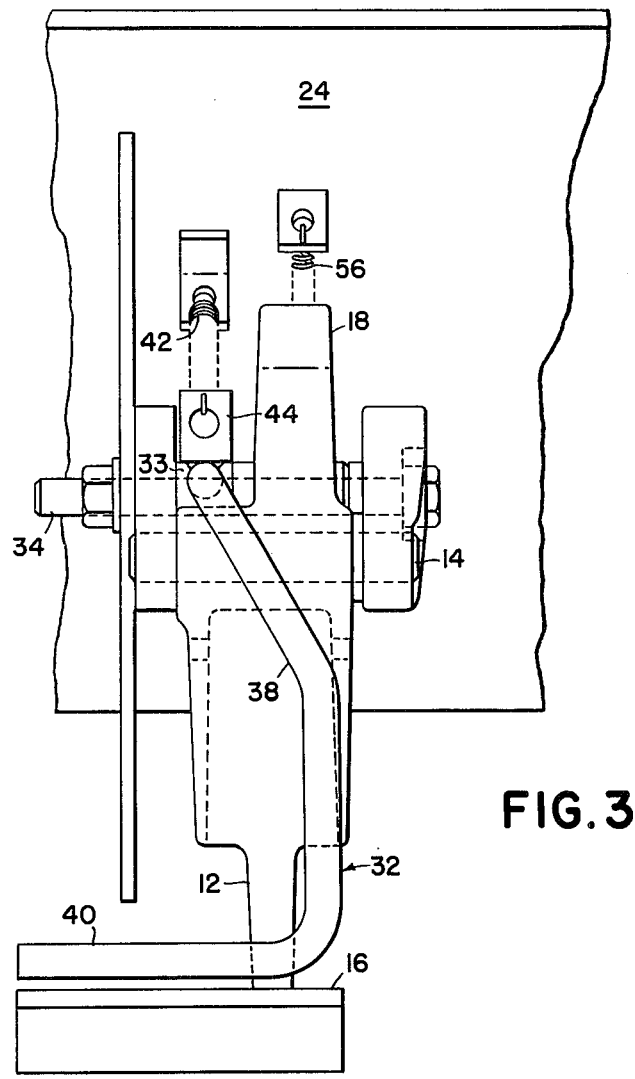
FIG. 3 is a front elevational view of the brake pedal and locking mechanism in the solid line position shown in FIG. 2.
Figure 4:
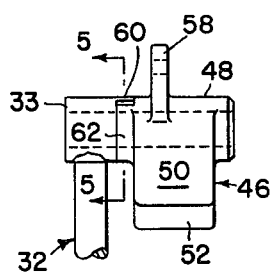
FIG. 4 is a top view of the locking pawl and part of the actuator rod as they appear in solid lines in FIG. 2.

Referring now to the drawings therein is shown a brake actuator 10 including a manually operable arm in the form of a brake pedal 12 mounted for pivotal movement about a horizontal transverse shaft 14 and including a foot-engageable pad 16 (FIGS. 2 and 3), located below the shaft 14, and a pawl engageable projection 18 located above the shaft 14. The shaft 14 is carried by a rearwardly projecting bracket 20 forming an extension of a brake valve housing 22 fixed to a support structure 24 and having a pair of valves (not shown), reciprocally mounted therein and coupled to the brake pedal 12 through means of respective plungers, only one of which is shown at 26. As is conventional, the pair of valves each have a return spring (not shown), associated therewith which act through the plungers 26 to normally maintain the pedal 12 in a rearward brake-release position, as shown in FIG. 1. It will be appreciated that simultaneous engagement of a pair of vehicle brakes (not shown), may be effected, in a conventional manner, by depressing the pedal 12 to rotate it from its brake-release position to a fully depressed brake-engage position as shown in FIG. 2. It is here noted that the pedal 12 may be overtravelled a short distance beyond its brake-engage position.

For the purpose of selectively locking the brake pedal 12 in its fully depressed brake-engage position, there is provided a locking mechanism 30. The locking mechanism 30 includes an actuator or control rod or member 32 having a hub 33 mounted for pivotal movement about a horizontal transverse shaft 34 mounted in the bracket 20 at a location forwardly of and slightly above the shaft 14. The actuator rod 32 includes a portion 36 which extends rearwardly from the hub 33 and terminates at a downwardly extending portion 38 which is located behind and in general parallelism to the pedal 12 when the pedal 12 is in its brake-engage position, as shown in FIG. 2 and when the rod 32 is also in a fully depressed pawl-activating position, as shown in solid lines in FIG. 2. A transverse foot-engageable portion 40 of the rod 32 then extends adjacent to a forward edge 41 of the pad 16 of the brake pedal 12. A tension spring 42 is mounted between the support structure 24 and a bracket 44 fixed to the rod portion 36 and acts to bias the actuator rod 32 clockwise about the shaft 34 to a fully released pawl-retain position, as shown in FIG. 1.

A locking pawl 46 includes a hub 48 pivotally mounted on the shaft 34 beside the hub 33 of the rod 32. The pawl 46 includes an arm 50 which is selectively swingable about the shaft between a normal pedal-release position (FIG. 1), wherein it is disposed free of the path of movement of the pawl-engageable projection 18 of the brake pedal 12 and pedal-lock position (FIG. 2), wherein it is disposed such that an end surface 52 thereof is in engagement with an undersurface 54 of the projection 18 so as to block the return of the brake pedal 12 to its brake-release position. A tension spring 56 is connected between the support 24 and a second arm 58 of the pawl 46 so as to bias the pawl 46 counterclockwise, as viewed in FIGS. 1 and 2, to its locking position. For a purpose to be explained below, the force developed by the spring 56 tending to rotate the pawl 46 counterclockwise is less than the force developed by the spring 42 tending to rotate the actuator member 32 clockwise.

The actuator rod 32 is connected to the pawl 46 through lost motion means, so that movement of the rod 32 from its pawl-retain to its pawl-release position will permit the pawl 46 to move from its pedal-release to its pedal-lock position by the action of the spring 56. Specifically, as can best be seen in FIGS. 4–7, the hub 33 of the rod 32 includes an axial projection 60 which extends approximately 135° about the shaft 34 and is disposed for engagement with an axial projection 62 of the hub 48 which extends approximately 180° about the shaft 34.

Figure 7:
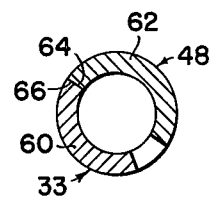
FIG. 7 is a view similar to FIG. 5 but showing the actuator rod and the pawl respectively in their pawl-retain and pedal-release positions illustrated in FIG. 1.

When the actuator rod 32 and the locking pawl 46 are in their respective pawl-retain and pedal-release positions shown in FIG. 1, the springs 42 and 56 will hold a trailing end surface 64 of the projection 60 against a leading end surface 66 of the projection 62 (FIG. 7). If the actuator 32 and the pedal 12 are then depressed together to their respective positions shown in FIG. 2, the force exerted by the spring 56 will cause the pawl 46 to rotate so as to follow the movement of the actuator 32 and the surfaces 64 and 66 will remain engaged with each other until the arm 50 of the pawl 46 engages the projection 18 of the brake pedal 12 whereupon the surface 64 of the actuator rod 32 will move away from the surface 66. Then upon the pedal 12 being depressed, the spring 56 will cause the pawl 46 to move into locking engagement with the projection 18, the projection 60 and 62 then occupying the positions shown in FIG. 5. If the operator then removes his foot from the brake pedal pad 16 and the actuator rod portion 40, the spring 42 will rotate the actuator rod 32 clockwise to reengage the surface 64 with the surface 66 (FIG. 6) whereupon the actuator rod 32 will stop in an intermediate released position, as shown in dashed lines in FIG. 2, with the foot engageable portion 40 thereof disposed away from the pad 16 of the brake pedal 12. Thus, the operator may then easily insert his foot between the actuator rod portion 40 and the pad 16 to exert a force on the pedal 12 to disengage the surface 54 from the locking pawl 46 whereupon the spring 42 will act in overriding relationship to the spring 56 to return the actuator rod 32 and pawl 46 to their respective pawl-retain and pedal-release positions.

The operation of the brake pedal locking mechanism 30 is thought to be clear from the foregoing description and for the sake of brevity no further description of the operation is given. Suffice it to say that the locking mechanism 30 is selectively operable concurrently with the operation of the brake actuator 10 by the same foot used to operate the actuator 10 thus leaving the operator's hands free to operate or continue operating the function controlling devices.

We claim:

1. A control, comprising: a support structure; an elongate manually operable control arm pivotally mounted on the support structure for movement between first and second positions and including an abutment surface located so as to be a trailing surface as the arm moves from its first to its second position; arm biasing means mounted between the support structure and the arm and urging the latter towards said first position; a locking pawl pivotally mounted on the support structure for movement between arm-release and arm-lock positions and including an abutment surface located so as to be in engagement with the abutment surface of the arm when the arm is in its second position and the pawl is in its arm-lock position and so to be free of the arm when the arm is in its first position and the pawl is in its arm-release position; an pawl biasing means connected between the support structure and the pawl and biasing the latter towards said arm-lock position; a manually operable control member pivotally mounted on the support structure for movement between pawl-retain and pawl-release positions; said pawl including a second abutment surface located so as to lead when the pawl is moving toward the arm-lock position; said control member including an abutment surface located so as to be in engagement with the second abutment surface of the pawl when the control member is in its pawl-retain position and when the pawl is in its arm-release position; a control member biasing means mounted between the support structure and control member and urging the control member towards its pawl-retaining position; said control member biasing means urging the abutment surface of the control member against the second abutment surface of the pawl with a force greater than the force exerted on the abutment surface of the control member by the second abutment surface of the pawl as effected by the pawl biasing means; said abutment surface of the control member being located so as to move in a direction away from the second abutment surface of the pawl as the control member is moved from its pawl-retain to its pawl-release position; and said control member and arm having respective manually engageable portions arranged to trace closely adjacent paths with the portion of the control member trailing the portion of the arm respectively during movement of the control member from its pawl-retain to its pawl-release position and during movement of the arm from its first to its second position, whereby an operator may use a single appendage to simultaneously move the arm and the control member when it is desired to lock the arm in its second position.

2. The control defined in claim 1 wherein the pawl and control member are mounted for rotation about a common axis.

3. A tractor service brake control, comprising:

a support structure; a brake pedal having a foot-engageable pad and being pivotally mounted on the support structure for movement among a normal rearward brake-release position, a forward overtravel position and an intermediate brake-engage position adjacent to the overtravel position; said pedal including an abutment surface located so as to be a trailing surface as the pedal moves from its brake-release to its brake-engage position, a pedal biasing means mounted between the support structure and the pedal and urging the latter toward its brake-release position; a locking pawl mounted on the support structure for pivotal movement between a normal pedal-release position and a pedal-lock position; said pawl including an abutment surface located so as to be in engagement with the abutment surface of the pedal when the pedal is in its brake-engage position and the pawl is in its pedal-lock position and so as to be free of the pedal when the pedal and pawl are in their respective normal positions; an actuator member pivotally mounted on the support structure for movement between a pawl-retain and a pawl-release position; said actuator member having an abutment surface and said pawl having a second abutment surface normally in engagement with the abutment surface of the actuator member; said abutment surface of the actuator member being positioned ahead of the second abutment surface of the pawl, as considered with reference to movement of the pawl from its pedal-release to its pedal-lock position; a pawl biasing means mounted between the support structure and the pawl and urging the abutment surface thereof towards engagement with the abutment surface of the actuator member; an actuator member biasing means mounted between the support structure and the actuator member and urging the abutment surface of the actuator member towards the second abutment surface of the pawl at a force greater than that developed by the pawl biasing means at the second abutment surface of the pawl; said actuator member including a foot-engageable portion disposed so as to be in trailing relationship to the foot-engageable pad of the pedal, as considered with reference to movement of the pedal from its brake-release to its brake-engage position and to movement of the actuator member from its pawl-retain to its pawl-release position, whereby an operator can simultaneously operate the actuator member and pedal with one foot; said abutment surfaces respectively of the pedal and pawl being so disposed relative to each other that the biasing means acting on the pedal keeps the surfaces engaged when the pedal is in its brake-engage position and the pawl is in its pedal-lock position; whereby movement of the pedal to its overtravel position from its brake-engage position when engaged with the pawl will result in the actuator member automatically returning to the pawl-retain position under the influence of the actuator member biasing means.

4. A tractor service brake control, comprising: a support structure; a brake pedal pivotally connected to the support structure for movement between brake-release and brake-engage positions; a locking pawl pivotally mounted on the support structure for movement between pedal-release and pedal-lock positions; said pedal and pawl having respective first and second abutment surfaces located relative to each other such that when the pedal and pawl are in their respective brake-engage and pedal-lock positions, the abutment surface of the pawl engages the abutment surface of the pedal to prevent movement of the pedal from its brake-engage position toward its brake-release position; an actuator member pivotally mounted on the support structure for movement between pawl-retain and pawl-release positions; said actuator member and pawl including cooperating means defining a one-way connection means for blocking movement of the pawl from its pedal-release position when the actuator member is in its pawl-retain position and for effecting movement of the pawl from its pawl-retain to its pedal-release position when the actuator member is moved from its pawl-release to its pawl-retain position; first and second biasing means respectively connected between the support structure and the pawl and actuator means; said first biasing means urging the pawl toward its pedal-lock position and towards engagement with the actuator member at said connection means and said second biasing means urging the actuator member toward its pawl-retain position and towards engagement with the pawl at said connection means; the second biasing means being sized and arranged such that it causes a force to be exerted on said pawl at said connection means which is greater than a force caused to be exerted on said actuator member at said connection means by said first biasing means; said brake pedal including a foot engageable pad which traces a first path as the pedal is moved from its brake-release to its brake-engage position and said actuator member including a foot-engageable portion located to trace a second path adjacent said first path and to follow the movement of the pad, as considered when the pedal moves from its brake-release to its brake-engage position and the actuator member moves from its pawl-retain to its pawl-release position; and said foot engageable portion being located relative to the pad such that both can be simultaneously engageable by an operator's foot.

5. The tractor service brake control defined in claim 4 wherein the pawl and the actuator member include respective hub portions mounted for rotation about a common axis.

6. The tractor service brake control defined in claim 4 wherein the pawl and the actuator member include respective hub portions mounted for rotation about a common axis and respectively including third and fourth abutment surfaces defining said connection means and located equidistant from the axis and in such relationship to each other that they are engaged with each other at least when the pawl and actuator members are in their respective pedal-release and pawl-retain positions.

7. The tractor service brake control defined in claim 6 wherein the pedal and the locking pawl include respective projections respectively defining said first and second abutment surfaces and being so located relative to each other and the actuator member that when the actuator member is moved toward its pawl-release position the projection of the pawl will move into engagement with the projection of the brake pedal prior to the actuator member reaching its pawl-release position and thus prior to the pedal being moved to its brake-engage position, the fourth abutment surface then becoming angularly separated from the third abutment surface upon further rotation of the hub of the actuator member; and the pawl further being located relative to the brake pedal and the actuator member such that it moves into locking engagement with the pedal when the latter is moved to its brake-engage position but remains separated from the actuator member whereby once the pedal is locked in its brake-engage position the actuator member may be released to return to an intermediate position in engagement with the pawl and displaced from the brake pedal.

8. The tractor service brake control defined in claim 5 wherein the axis is located forwardly of the pedal, with reference to a normal forward direction of travel, and the actuator member is in the form of a rod extending rearwardly of the pedal and including a transverse rear end portion forming said foot-engageable portion.

9. The tractor service brake control defined in claim 4 wherein the actuator member is mounted and configured in such relationship to the brake pedal that, when the tractor member is in its pawl-retain position and the brake pedal is in its brake-release position, the foot engageable portion is spaced above the pad a distance requiring movement of the actuator member to an intermediate position more than halfway towards its pawl-release position before the foot-engageable portion is close enough to the pad for an operator to simultaneously operate both the actuator member and the brake pedal with one foot; said connection means including third and fourth abutment surfaces respectively defined by the pawl and actuator member and disposed in engagement with each other when the pawl and actuator members are respectively in their pedal-release and pawl-retain positions; said third and fourth abutment surfaces respectively being trailing and leading surfaces as considered when the actuator member is moving towards its pawl-release portion and the pawl is moving toward its pedal-lock position; said pedal and pawl including respective projections respectively defining said first and second abutment surfaces; said projections being so located relative to each other that a non-locking engagement of the projection of the pawl with the projection of the pedal will occur when the actuator member reaches said intermediate position whereby further movement of the actuator member toward its pawl-release position will cause the fourth abutment surface to move away from the third abutment surface; and said projections further being disposed such that when the actuator member is in its pawl-release position and the pedal is in its brake-engage position the first and second abutment surfaces will be in engagement with each other and a separation will be present between the third and fourth abutment surfaces whereby upon the operator removing his foot from the actuator member and the pedal the actuator member will move toward its pawl retain position under the influence of the second biasing means to thus bring the fourth abutment surface into engagement with the third abutment surface and to thus move the foot engageable portion away from the pad.

* * * * *

UNITED STATES PATENT OFFICE
CERTIFICATE OF CORRECTION

Patent No. 4,037,487       Dated 26 July 1977

Inventor(s) Brian Alvin Ahlschwede and Edwin Lee Whisler

It is certified that error appears in the above-identified patent and that said Letters Patent are hereby corrected as shown below:

Column 4, line 28, after "so" insert --as--; line 30, delete "an" and insert --a--.

Column 6, line 14, delete "pawl-retain" and insert --pedal-retain--.

Column 7, line 18, delete "tractor" and insert --actuator--.

Signed and Sealed this

Eighteenth Day of April 1978

[SEAL]

Attest:

RUTH C. MASON  
Attesting Officer

LUTRELLE F. PARKER  
Acting Commissioner of Patents and Trademarks